(12) United States Patent
Yamamoto et al.

(10) Patent No.: US 10,809,015 B2
(45) Date of Patent: Oct. 20, 2020

(54) COOLANT SUPPLY DEVICE

(71) Applicant: DMG MORI CO., LTD., Nara (JP)

(72) Inventors: Kosuke Yamamoto, Nara (JP); Mitsuru Taga, Nara (JP); Futoshi Yamazaki, Nara (JP); Yoshiaki Azuma, Nara (JP)

(73) Assignee: DMG MORI CO., LTD., Nara (JP)

( * ) Notice: Subject to any disclaimer, the term of this patent is extended or adjusted under 35 U.S.C. 154(b) by 218 days.

(21) Appl. No.: 15/980,460

(22) Filed: May 15, 2018

(65) Prior Publication Data

US 2018/0340742 A1    Nov. 29, 2018

(30) Foreign Application Priority Data

May 26, 2017 (JP) ................................. 2017-104361

(51) Int. Cl.
  *F28D 21/00* (2006.01)
  *B23Q 11/10* (2006.01)
  (Continued)

(52) U.S. Cl.
  CPC ...... *F28D 21/0017* (2013.01); *B23Q 11/1069* (2013.01); *B24B 55/03* (2013.01);
  (Continued)

(58) Field of Classification Search
  CPC ............ F28D 21/0017; F28D 2021/004; F28F 13/06; F28F 2250/08; F28F 2250/102; B23Q 11/1069; B24B 55/03
  (Continued)

(56) References Cited

U.S. PATENT DOCUMENTS

| | | | |
|---|---|---|---|
| 9,832,909 B2* | 11/2017 | Tanaka | H02M 7/003 |
| 2009/0065181 A1* | 3/2009 | Mockry | F28C 1/02 |
| | | | 165/104.28 |

FOREIGN PATENT DOCUMENTS

| | | |
|---|---|---|
| EP | 1348518 A2 | 10/2003 |
| JP | 2009226491 A * | 10/2009 |

(Continued)

OTHER PUBLICATIONS

European Search Report for related European Application No. 18173620.8; report dated Oct. 16, 2017.

*Primary Examiner* — Tho V Duong
*Assistant Examiner* — Rahenna R Malik
(74) *Attorney, Agent, or Firm* — Miller, Matthias & Hull LLP

(57) ABSTRACT

A coolant supply device includes a coolant tank having first and second coolant reservoirs arranged in parallel with a predetermined space therebetween and a communicating part arranged between the first and second coolant reservoirs to allow them to communicate with each other, and formed to have a U-shaped overall shape. The coolant supply device further includes pumps pumping up coolant from the second coolant reservoir and supplying the coolant to predetermined destinations. The coolant supplied by the pumps is returned to the first coolant reservoir and flows into the second coolant reservoir through the communicating part. The first coolant reservoir has a first agitating nozzle body disposed therein for discharging coolant to assist a flow of coolant flowing toward the communicating part, and the second coolant reservoir has a second agitating nozzle body disposed therein for discharging coolant to assist a flow of coolant flowing therein from the communicating part.

9 Claims, 3 Drawing Sheets

(51) Int. Cl.
    *B24B 55/03*    (2006.01)
    *F28F 13/06*    (2006.01)
(52) U.S. Cl.
    CPC ........ *F28F 13/06* (2013.01); *F28D 2021/004* (2013.01); *F28F 2250/08* (2013.01); *F28F 2250/102* (2013.01)
(58) Field of Classification Search
    USPC .......................................................... 165/96
    See application file for complete search history.

(56) References Cited

FOREIGN PATENT DOCUMENTS

| | | | |
|---|---|---|---|
| JP | 2009226491 | A | 10/2009 |
| WO | 03070425 | A1 | 8/2003 |

\* cited by examiner

US 10,809,015 B2

COOLANT SUPPLY DEVICE

BACKGROUND

Field of the Disclosure

This disclosure relates to a coolant supply device supplying coolant to a predetermined destination, such as a machining area of a machine tool or the like.

Background of the Disclosure

A coolant processing device has been proposed which is configured to supply coolant into a machining area of a machine tool and separate chips and the like from coolant returned from the machine tool, as described in Japanese Unexamined Patent Application Publication No. 2009-226491.

This coolant processing device is configured to include a dirty reservoir receiving chips and coolant exhausted from the machine tool, a filtering drum immersed in coolant in the dirty reservoir and filtering the coolant in the process of taking in the coolant, a first coolant reservoir disposed to be connected to a first side surface of the dirty reservoir and having a path communicating with an internal space of the filtering drum through an opening formed in the first side surface of the dirty reservoir, a second coolant reservoir disposed on a second side surface side of the dirty reservoir and surrounded by a sidewall, a connecting path communicating with the first coolant reservoir and the second coolant reservoir, and a pump disposed away from the sidewall of the second coolant reservoir and near the center of the second coolant reservoir in plan view and pumping up coolant from the second coolant reservoir and supplying the coolant to the machine tool.

A rear sidewall surface of the connecting path extends from a rear sidewall surface of the second coolant reservoir, and a portion of the sidewall of the second coolant reservoir which extends from the rear side to the dirty reservoir side through the front side thereof is formed by a continuous surface including a concave surface. Note that the first coolant reservoir, the second coolant reservoir, and the connecting path together constitute a coolant tank.

In this coolant processing device, because the pump disposed near the center of the second coolant reservoir pumps up coolant from the second coolant reservoir, a vortex flow of coolant around a pump-up port of the pump is formed in the second coolant reservoir and foreign substances in the second coolant reservoir is pumped up by the pump. Therefore, accumulation and stagnation of foreign substances in the second coolant reservoir can be suppressed.

SUMMARY OF THE DISCLOSURE

However, even in this conventional coolant processing device designed as described above, the problem of deposition and accumulation of chips, sludge, and the like at locations in the coolant tank has not been sufficiently solved.

That is, the above-described conventional coolant processing device produces a flow of a coolant flowing from the first coolant reservoir toward the second coolant reservoir by virtue of the action of pumping up coolant with the pump and the action of returning coolant from the machine tool to the device. Therefore, except for a case where the pump has a very high pump-up ability, in a case where the pump has a pump-up ability typically required in a machine tool, a liquid flow with a flow velocity sufficient to suppress deposition and accumulation of chips, sludge, and the like cannot be produced in the first coolant reservoir, the second coolant reservoir, and the connecting path.

This disadvantage results in a problem that chips, sludge, and the like deposit and accumulate at locations in the first coolant reservoir, the second coolant reservoir, and the connecting path.

The present invention has been achieved in view of the above-described circumstances, and an object thereof is to provide a coolant supply device which can produce a liquid flow with a sufficient flow velocity in a coolant tank to suppress deposition and accumulation of foreign substances in the coolant tank.

The present invention, for solving the above-described problems, relates to a coolant supply device, including:

a coolant tank including a first coolant reservoir, a second coolant reservoir, and a communicating part and formed to have a substantially U-shaped overall shape in plan view, the first and second coolant reservoirs each having a substantially rectangular shape in plan view and being arranged in parallel with a predetermined space therebetween, the communicating part being arranged at an end between the first and second coolant reservoirs and having one end connected to a sidewall of the first coolant reservoir and another end connected to a sidewall of the second coolant reservoir to allow the first coolant reservoir and the second coolant reservoir to communicate with each other; and a supply pump pumping up coolant from the second coolant reservoir and supplying the coolant to a predetermined destination, the coolant supply device being configured such that the coolant supplied to the predetermined destination by the supply pump is returned to the first coolant reservoir and coolant in the first coolant reservoir flows into the second coolant reservoir through the communicating part, the coolant supply device being configured to include:
at least one agitation pump pumping up coolant from the coolant tank;
a first agitating nozzle body disposed in the first coolant reservoir and discharging the coolant supplied by the agitation pump to assist a flow of coolant flowing toward the communicating part; and
a second agitating nozzle body disposed in the second coolant reservoir and discharging the coolant supplied by the agitation pump to assist a flow of coolant flowing into the second coolant reservoir from the communicating part.

In this coolant supply device, coolant in the second coolant reservoir is pumped up and supplied to a predetermined destination, for example, a machining area of a machine tool, by the supply pump. The supplied coolant, with which foreign substances, such as chips, sludge, and the like mixed in, is returned to the first coolant reservoir through a predetermined flow path. The coolant returned to the first coolant reservoir flows into the second coolant reservoir through the communicating part.

Further, the first coolant reservoir has the first agitating nozzle body provided therein, and coolant in the coolant tank is supplied to the first agitating nozzle body by the agitation pump and the supplied coolant is discharged from the first agitating nozzle body. The coolant discharged from the first agitating nozzle body assists a flow of coolant flowing toward the communicating part, thereby agitating coolant in the first coolant reservoir and increasing the velocity of a flow of coolant flowing through the communicating part.

Accordingly, the action of agitating coolant in the first coolant reservoir and the action of accelerating coolant in the communicating part suppress deposition and accumulation of foreign substances in the first coolant reservoir and in the communicating part.

Further, the second coolant reservoir has the second agitating nozzle body provided therein, and coolant is supplied also to the second agitating nozzle body by the agitation pump and the supplied coolant is discharged from the second agitating nozzle body. The coolant discharged from the second agitating nozzle body assists a flow of coolant flowing into the second coolant reservoir from the communicating part, thereby agitating coolant in the second coolant reservoir. This action of agitating coolant suppresses deposition and accumulation of foreign substances in the second coolant reservoir.

Thus, in the coolant supply device according to the present invention, coolant discharged from the first agitating nozzle body and coolant discharged from the second agitating nozzle body agitate coolant in the first coolant reservoir and in the second coolant reservoir, and accelerate the flow of coolant flowing through the communicating part, which can suppress deposition and accumulation of foreign substances in the first and second coolant reservoirs and in the communicating part.

Note that, in the above coolant supply device, it is preferred that at least one of the first and second agitating nozzle bodies has a plurality of discharge ports and a discharge direction of at least one of the plurality of discharge ports is directed more centrally of a corresponding coolant reservoir than a discharge direction of a remaining discharge port.

The provision of a plurality of discharge ports with the discharge direction of at least one of the discharge ports being directed more centrally of the corresponding coolant reservoir than the discharge direction of the remaining discharge port enables agitating coolant in the reservoir evenly, which can effectively suppress deposition and accumulation of chips, sludge, and the like. That is, even though each coolant reservoir is relatively susceptible to stagnation around the center thereof, directing the coolant discharge direction more centrally of the reservoir can prevent the occurrence of stagnation around the center of the reservoir, and thereby prevent deposition and accumulation of foreign substances around the center of the reservoir.

In a case where either one of the first and second coolant reservoirs is susceptible to deposition and accumulation of foreign substances, a configuration can be employed in which a corresponding one of the first and second agitating nozzle bodies has a plurality of discharge ports. Conversely, in a case where both of the first and second coolant reservoirs are susceptible to deposition and accumulation of foreign substances, a configuration can be employed in which both of the first and second agitating nozzle bodies have a plurality of discharge ports.

Further, in the above coolant supply device, the second coolant reservoir may have a baffle plate disposed therein at a position ahead in the coolant discharge direction of the second agitating nozzle body. It is preferred that the baffle plate extends inward from an inner wall of the second coolant reservoir to obstruct the flow of coolant, with a clearance between the baffle plate and a bottom of the second coolant reservoir such that the coolant can flow through the clearance.

In the second coolant reservoir, the coolant discharged from the discharge port of the second agitating nozzle body assists a liquid flow and forms a swirl flow (vortex flow) swirling along the wall of the reservoir. Accordingly, the velocity of the flow of coolant is smallest at a position remote from the second agitating nozzle body, that is, at a position ahead of the second agitating nozzle body, and therefore the position is susceptible to deposition and accumulation of foreign substances.

In the coolant supply device having the baffle plate, since the baffle plate is provided at the position ahead of the second agitating nozzle body at which the velocity of the flow of coolant is smallest, the flow of coolant flowing ahead from the second agitating nozzle body is obstructed by the baffle plate, and this causes the flow of coolant to flow through the clearance between the baffle plate and the bottom of the second coolant reservoir. The flow path of the coolant being thus narrowed by the baffle plate increases the velocity of the flow of coolant flowing through the clearance, thereby preventing deposition and accumulation of foreign substances at the clearance.

Further, in the above coolant supply device, it is preferred that the second coolant reservoir has a flow adjusting plate disposed therein which extends from the communicating part along an inner wall surface of the second coolant reservoir and faces the inner wall surface to adjust the flow of coolant flowing into the second coolant reservoir from the communicating part.

As described above, in the second coolant reservoir, the coolant discharged from the discharge port of the second agitating nozzle body assists a coolant flow and forms a swirl flow swirling along the wall of the reservoir. Therefore, at the connecting portion between the communicating part and the second coolant reservoir, the flow of coolant flowing into the second coolant reservoir from the communicating part collides with the swirling flow of coolant in the second coolant reservoir and thereby is blocked, which makes the communicating part susceptible to deposition and accumulation of foreign substances.

The provision of the flow adjusting plate allows the flow of coolant flowing into the second coolant reservoir from the communicating part and the swirl flow of coolant in the second coolant reservoir to join together smoothly at the connecting portion between the communicating part and the second coolant reservoir, so that the flow of coolant flowing from the communicating part successfully flows into the second coolant reservoir. Thereby, deposition and accumulation of foreign substances in the communicating part are prevented.

As described above, in the coolant supply device according to the present invention, coolant discharged from the first agitating nozzle body and coolant discharged from the second agitating nozzle body agitate coolant in the first coolant reservoir and in the second coolant reservoir and accelerate a flow of coolant flowing through the communicating part. Therefore, the coolant supply device according to the present invention can suppress deposition and accumulation of foreign substances in the first and second coolant reservoirs and in the communicating part.

DETAILED DESCRIPTION

Figure 1:
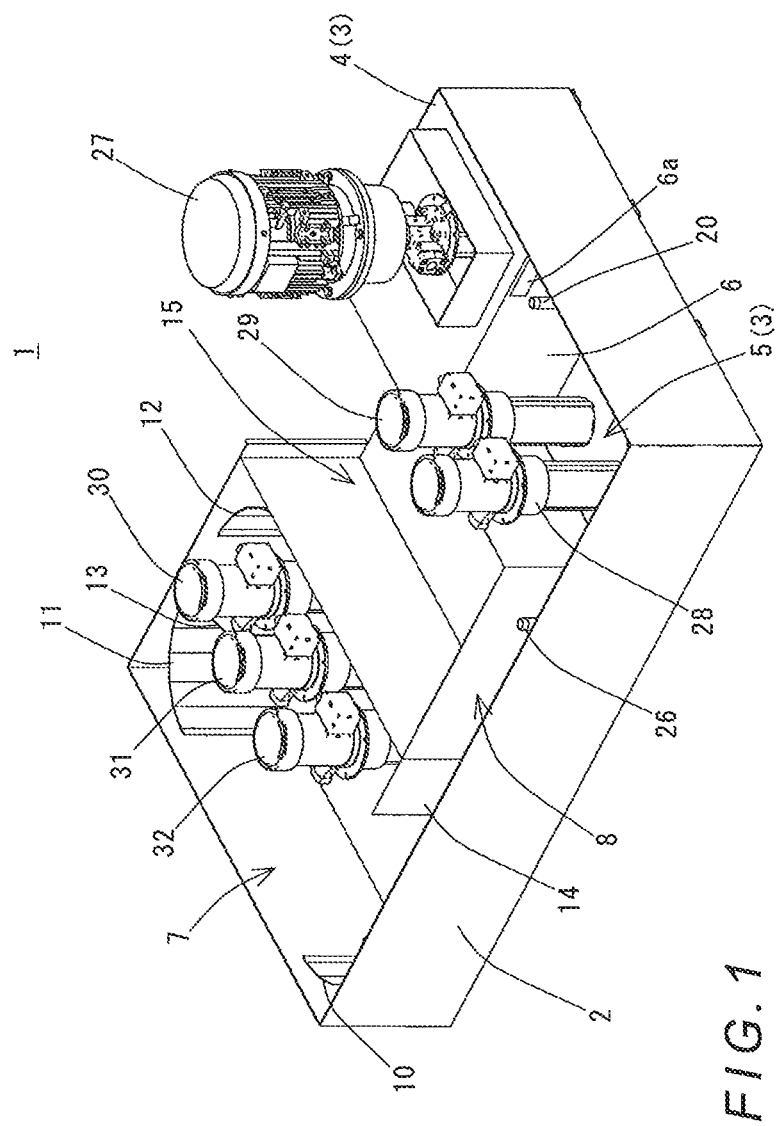
FIG. 1 is a perspective view of a coolant supply device according to an embodiment of the present invention.
Figure 2:
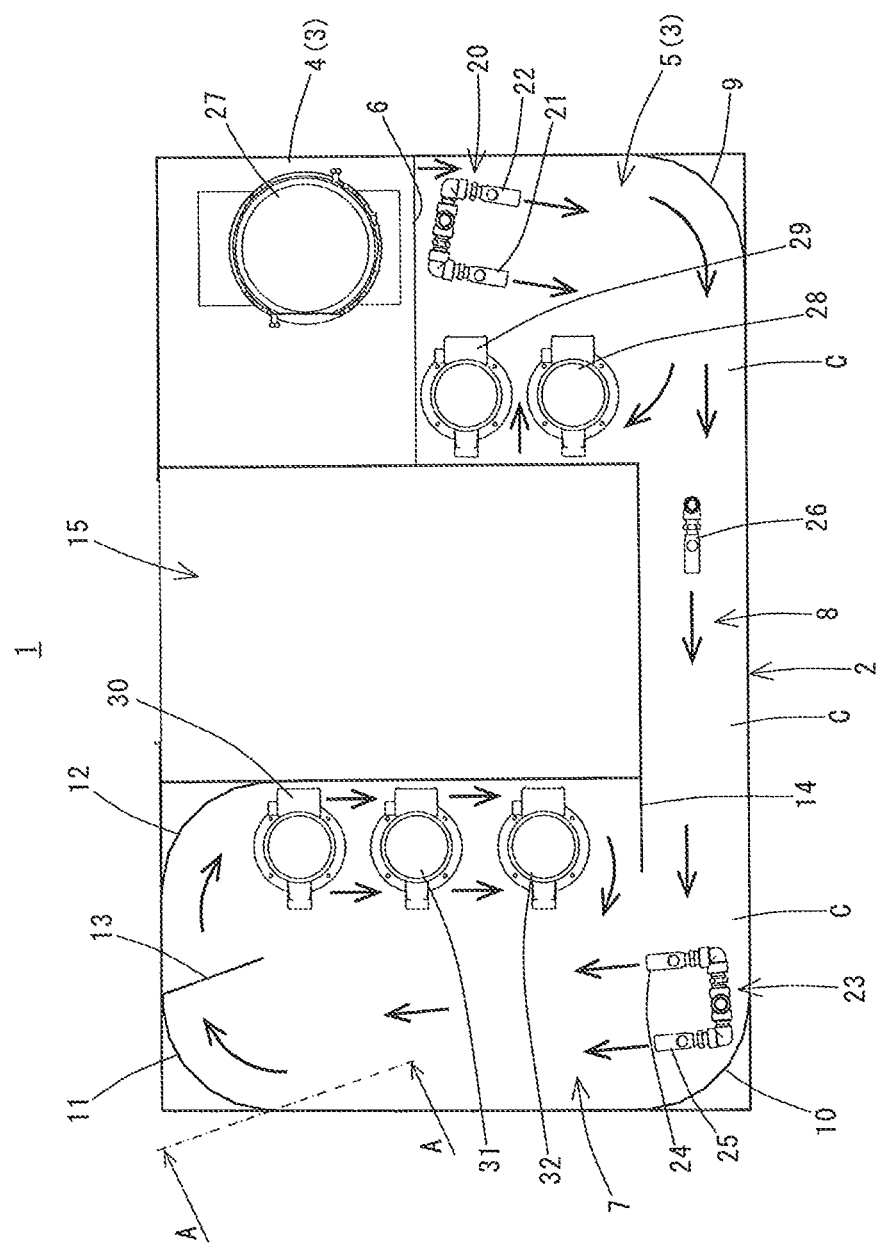
FIG. 2 is a plan view of the coolant supply device according to the embodiment.

Hereinafter, a specific embodiment of the present invention will be described with reference to the drawings. A coolant supply device 1 according to this embodiment is attached to a machine tool, which is not shown in the drawings, to supply coolant C to a machining area and the like of the machine tool. As shown in FIGS. 1 and 2, the coolant supply device 1 includes a coolant tank 2 which is formed to have a substantially U-shaped overall shape in plan view and stores coolant C therein.

Specifically, the coolant tank 2 includes a first coolant reservoir 3 and a second coolant reservoir 7 each having a rectangular shape in plan view and arranged in parallel with a predetermined space therebetween, as well as a communicating part 8 arranged between ends (ends illustrated on the lower side in FIG. 2) of the first coolant reservoir 3 and second coolant reservoir 7 and having one end connected to a sidewall of the first coolant reservoir 3 and another end connected to a sidewall of the second coolant reservoir 7 to allow the first coolant reservoir 3 and the second coolant reservoir 7 to communicate with each other. Further, the first coolant reservoir 3 is liquid-tightly divided into two reservoirs by a divider 6; the upper reservoir in FIG. 2 being a highly clean reservoir 4 and the lower reservoir in FIG. 2 being a return reservoir 5.

As shown in FIG. 2, the return reservoir 5 has a flow adjusting plate 9 disposed at the lower right corner thereof in FIG. 2, and similarly the second coolant reservoir 7 has flow adjusting plates 10, 11, 12 disposed at corners thereof. Each of the flow adjusting plates 9, 10, 11, 12 is folded to be multifaceted, thereby being formed in a substantially arc shape.

The highly clean reservoir 4 has a first pump 27 disposed therein, and the return reservoir 5 has a second pump 28 and a third pump 29 disposed therein near a sidewall thereof located on the second coolant reservoir 7 side. Further, the return reservoir 5 has a first agitating nozzle body 20 disposed therein at a position diagonal to the connecting portion between the communicating part 8 and the return reservoir 5. Furthermore, the second coolant reservoir 7 has a second agitating nozzle body 23 disposed therein at a position facing the connecting portion between the communicating part 8 and the second coolant reservoir 7, and has a fourth pump 30, a fifth pump 31, and a sixth pump 32 disposed therein near a sidewall thereof located on the first coolant reservoir 3 side. Further, the communicating part 8 has a third agitating nozzle body 26 disposed therein. Note that the first agitating nozzle body 20, the second agitating nozzle body 23, and the third agitating nozzle body 26 are being immersed in coolant C.

The first pump 27 pumps up coolant C from the highly clean reservoir 4 and supplies the pumped-up coolant C to a circulating path formed in a spindle of the machine tool. The second pump 28 pumps up coolant C from the return reservoir 5 and supplies the pumped-up coolant C to the first agitating nozzle body 20, the second agitating nozzle body 23, and the third agitating nozzle body 26. The third pump 29 pumps up coolant C from the return reservoir 5 and supplies the pumped-up coolant C to a destination above the machining area of the machine tool to discharge the coolant C into the machining area.

The fourth pump 30, the fifth pump 31, and the sixth pump 32 each pump up coolant C from the second coolant reservoir 7, the fourth pump 30 supplies the pumped-up coolant C to a filter device, which is not shown in the drawings, the fifth pump 31 supplies the pumped-up coolant C to a destination near the spindle of the machine tool to discharge the coolant C into the machining area, and the sixth pump 32 supplies the pumped-up coolant C to a base of the machine tool. Note that the first pump 27 is mounted on a mounting plate (not shown) that constitutes a top plate of the highly clean reservoir 4, and the second pump 28, the third pump 29, the fourth pump 30, the fifth pump 31, and the sixth pump 32 are mounted on a top plate (not shown) closing the coolant tank 2.

Further, a chip conveyor (not shown) as disclosed in Japanese Unexamined Patent Application Publication No. 2009-226491 mentioned above is disposed in the space between the first coolant reservoir 3 and the second coolant reservoir 7 of the coolant tank 2. This chip conveyor collects the coolant C supplied to the machining area of the machine tool, with chips and sludge contained in the coolant C.

The chip conveyor has incorporated therein a drum-shaped filter (drum filter) (not shown) as disposed in Japanese Unexamined Patent Application Publication No. 2009-226491 mentioned above. When coolant C flows into the drum filter, the coolant C is filtered and thereby chips and sludge of a certain size are separated and removed from the coolant C. The internal space of the drum filter liquid-tightly communicates with the coolant tank 2 through an opening (not shown) formed in the sidewall of the return reservoir 5 located on the second coolant reservoir 7 side. Accordingly, the coolant C supplied to the machining area of the machine tool is collected in the chip conveyor, and filtered by the drum filter, after which the coolant C is returned to the return reservoir 5.

Note that the coolant C supplied to the circulating path of the spindle by the first pump 27 and the coolant C supplied to the base of the machine tool by the sixth pump 32 are returned to the return reservoir 5 through separate flow paths. Further, the coolant C pumped up by the sixth pump 32 is used also for so-called backwash for unclogging the drum filter. Further, the coolant C pumped up by the fourth pump 30 is, as described above, supplied to the not-shown filter device, and highly purged by the filter device, after which the coolant C is supplied to the highly clean reservoir 4. If an excessive amount of coolant C is supplied to the highly clean reservoir 4, the coolant C overflows into the return reservoir 5 through an opening 6a formed in the divider 6.

The first agitating nozzle body 20 includes two nozzles 21, 22 arranged in parallel and discharging the coolant C supplied by the second pump 28 toward the communicating part 8. The coolant C discharged from the nozzle 22 produces a liquid flow which flows substantially along sidewalls of the return reservoir 5, while the coolant C discharged from the nozzle 21 produces a liquid flow which is directed approximately to the center of the return reservoir 5.

The third agitating nozzle body 26 is disposed so as to discharge the coolant C supplied by the second pump 28 toward the second coolant reservoir 7.

The second agitating nozzle body 23 includes two nozzles 24, 25 arranged in parallel and discharging the coolant C supplied by the second pump 28 in a direction substantially perpendicular to a flow of coolant C flowing into the second coolant reservoir 7 from the communicating part 8, that is, in the upward direction in FIG. 2. The coolant C discharged from the nozzle 25 produces a liquid flow which flows substantially along sidewalls of the second coolant reservoir 7, while the coolant C discharged from the nozzle 24 produces a liquid flow which is directed approximately to the center of the second coolant reservoir 7.

Figure 3:
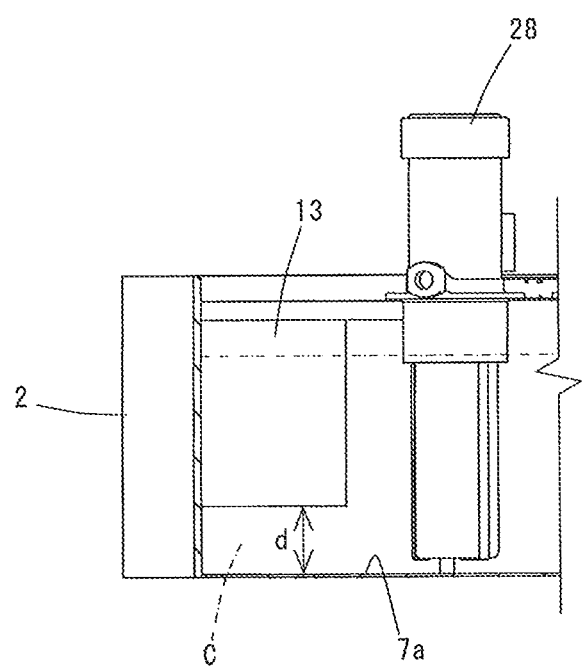
FIG. 3 is a sectional view taken along line A-A in FIG. 2.

Further, the second coolant reservoir 7 has a baffle plate 13 disposed therein at a position ahead in the direction of the discharge of coolant C from the second agitating nozzle body 23. The baffle plate 13, as shown in FIG. 2, extends inward from an inner wall of the second coolant reservoir 7 to obstruct the flow of coolant C. Further, as shown in FIG. 3, a clearance is formed with a distance d between the baffle plate 13 and a bottom 7*a* of the second coolant reservoir 7, through which clearance coolant C can flow.

Further, the second coolant reservoir 7 has a flow adjusting plate 14 disposed therein at the connecting portion between the communicating part 8 and the second coolant reservoir 7, the flow adjusting plate 14 extending from the communicating part 8 along an inner wall surface (inner wall surface illustrated on the lower side in FIG. 2) of the second coolant reservoir 7 that continues from the communicating part 8, and facing the inner wall surface.

In the coolant supply device 1 according to this embodiment having the above-described configuration, as described above, coolant C in the second coolant reservoir 7 is pumped up by the fourth pump 30, the fifth pump 31, and the sixth pump 32, the pumped-up coolant C is supplied to the above-mentioned destinations, and the supplied coolant C is returned to the return reservoir 5. Thus, this circulation of coolant C forms a basic flow of coolant C that flows from the reservoir 5 into the second coolant reservoir 7 through the communicating part 8.

Specifically, coolant C from the machining area of the machine tool is returned to the return reservoir 5 via the chip conveyor. Further, coolant C supplied to the circulating path of the spindle by the first pump 27 is returned to the return reservoir 5 through an appropriate flow path, and coolant C supplied to the base of the machine tool by the sixth pump 32 is also returned to the return reservoir 5 through an appropriate flow path. Furthermore, coolant C supplied to the highly clean reservoir 4 by the fifth pump 31 overflows into the return reservoir 5. In the return reservoir 5, such coolant C produces a liquid flow which flows toward the communicating part 8, and therefore the coolant C flows from the return reservoir 5 into the second coolant reservoir 7 through the communicating part 8.

Further, in the second coolant reservoir 7, coolant C is pumped up by the fourth pump 30, the fifth pump 31, and the sixth pump 32, and their pumping-up actions and the flow of coolant C flowing into the second coolant reservoir 7 from the communicating part 8 produce a swirl flow.

In this coolant supply device 1, in the return reservoir 5, the nozzles 21, 22 of the first agitating nozzle body 20 discharge coolant C supplied thereto by the second pump 28, the coolant C discharged from the nozzle 22 produces a liquid flow which flows substantially along the sidewalls of the return reservoir 5, and the coolant C discharged from the nozzle 21 produces a liquid flow which is directed approximately to the center of the return reservoir 5. Thereby, the flow of coolant C flowing toward the communicating part 8 is assisted by the coolant C discharged from the nozzles 21, 22 and the coolant C in the return reservoir 5 is agitated. Further, the arc-shaped flow adjusting plate 9 disposed at the corner of the return reservoir 5 enables a stagnation-free, smooth flow of coolant C at the corner.

As described above, in the return reservoir 5, the flow of coolant C therein is assisted, the coolant C therein is agitated, and a stagnation-free, smooth flow of coolant C is formed. Therefore, even if foreign substances such as chips and sludge are mixed in with the coolant C, deposition and accumulation of such foreign substances can be suppressed.

Further, in the communicating part 8, coolant C is discharged from the third agitating nozzle body 26 toward the second coolant reservoir 7. Therefore, the coolant C flowing into the second coolant reservoir 7 from the return reservoir 5 is assisted and accelerated by the coolant C discharged from the third agitating nozzle body 26 and this coolant C flows into the second coolant reservoir 7. Thereby, deposition and accumulation of foreign substances in the communicating part 8 can be suppressed.

On the other hand, in the second coolant reservoir 7, the nozzles 24, 25 of the second agitating nozzle body 23 discharge coolant C supplied thereto by the second pump 28, the coolant C discharged from the nozzle 25 produces a liquid flow which flows substantially along the sidewalls of the second coolant reservoir 7, and the coolant discharged from the nozzle 24 produces a liquid flow which is directed approximately to the center of the second coolant reservoir 7. Thereby, the flow (swirl flow) of coolant C in the second coolant reservoir 7 is assisted and agitated by the coolant C discharged from the nozzles 24, 25. Further, the arc-shaped flow adjusting plates 10, 11, 12 disposed at the corners of the second coolant reservoir 7 enable a stagnation-free, smooth flow of coolant C at the corners.

Note that the velocity of the swirl flow formed in the second coolant reservoir 7 is smallest at a position remote from the second agitating nozzle body 23, that is, at a position ahead in the discharge direction of the second agitating nozzle body 23. In the flow path following the position, the flow velocity is increased by the pump-up actions of the fourth pump 30, fifth pump 31, and sixth pump 32.

In the coolant supply device 1 according to this embodiment, the baffle plate 13 is provided at a position at which the velocity of the flow of coolant C is small; the action of the baffle plate 13 can increase the velocity of the flow of coolant C. That is, the flow of coolant C flowing ahead from the second agitating nozzle body 23 is obstructed by the baffle plate 13, and this causes the flow of coolant C to flow through the clearance formed between the baffle plate 13 and the bottom 7*a* of the second coolant reservoir 7 shown in FIG. 3. The flow path of the coolant C being thus narrowed by the baffle plate 13 increases the velocity of the flow of coolant C flowing through the clearance.

Thus, in the second coolant reservoir 7, the flow of coolant therein is assisted by the coolant discharged from the second agitating nozzle body 23 and thereby the coolant therein is agitated, and a stagnation-free, smooth flow of coolant is formed by the flow adjusting plates 10, 11, 12. These actions consequently suppress deposition and accumulation of foreign substances in the second coolant reservoir 7.

Further, the baffle plate 13 is provided at a position at which the velocity of the flow of coolant C is small; therefore, the velocity of the flow of coolant C can be increased when the coolant C flows through the clearance between the baffle plate 13 and the bottom 7*a* of the second coolant reservoir 7. Thereby, deposition and accumulation of foreign substances at the position are prevented.

Furthermore, in the second coolant reservoir 7 in this embodiment, the flow adjusting plate 14 is provided at the connecting portion between the communicating part 8 and the second coolant reservoir 7, the flow adjusting plate 14 extending from the communicating part 8 along the inner wall surface (inner wall surface illustrated on the lower side in FIG. 2) of the second coolant reservoir 7 that continues from the communicating part 8, and facing the inner wall surface.

As described above, in the second coolant reservoir 7, the coolant flow is assisted by the coolant C discharged from the second agitating nozzle body 23 and a swirl flow swirling along the wall of the second coolant reservoir 7 is formed. Therefore, at the connecting portion between the communicating part 8 and the second coolant reservoir 7, the flow of coolant C flowing into the second coolant reservoir 7 from the communicating part 8 collides with the swirl flow of coolant C in the second coolant reservoir 7 and thereby is blocked, which makes the communicating part 8 susceptible to deposition and accumulation of foreign substances.

Accordingly, the provision of the flow adjusting plate 14 allows the flow of coolant flowing into the second coolant reservoir 7 from the communicating part 8 and the swirl flow of coolant in the second coolant reservoir 7 to join together smoothly at the connecting portion between the communicating part 8 and the second coolant reservoir 7, so that the coolant C flowing from the communicating part 8 successfully flows into the second coolant reservoir 7. Thereby, deposition and accumulation of foreign substances at the connecting portion between the communicating part 8 and the second coolant reservoir 7 is prevented.

The foregoing has described a coolant supply device according to an embodiment of the present invention. However, the present invention is not limited thereto and can be implemented in other modes.

For example, although the above embodiment has the configuration in which the first agitating nozzle body 20 is composed of the nozzles 21, 22 and the second agitating nozzle body 23 is composed of the nozzles 24, 25, the present invention is not limited to such a configuration. The first agitating nozzle body 20 and the second agitating nozzle body 23 each may be composed of one nozzle or may be composed of three or more nozzles. The number of nozzles can be determined to an appropriate one which can eliminate deposition and accumulation of foreign substances in the return reservoir 5 and the second coolant reservoir 7, in accordance with the state of the deposition and accumulation. Further, the discharge direction of each nozzle also can be determined to an appropriate one which can eliminate deposition and accumulation of foreign substances in each reservoir.

Further, the provision of the third agitating nozzle body 26 is optional. If deposition and accumulation of foreign substances do not occur in the communicating part 8, there is no particular need to provide the third agitating nozzle body 26.

Further, the present invention does not necessarily require all the first pump 27 through the sixth pump 32; the pumps can be provided as appropriate in accordance with the purpose of supplying coolant.

What is claimed is:

1. A coolant supply device, comprising:
a coolant tank including a first coolant reservoir, a second coolant reservoir, and a communicating part and formed to have a substantially U-shaped overall shape in plan view, the first and second coolant reservoirs each having a substantially rectangular shape in plan view and being arranged in parallel with a predetermined space therebetween, the communicating part being arranged at an end between the first and second coolant reservoirs and having one end connected to a sidewall of the first coolant reservoir and another end connected to a sidewall of the second coolant reservoir to allow the first coolant reservoir and the second coolant reservoir to communicate with each other; and
a supply pump pumping up coolant from the second coolant reservoir and supplying the coolant to a predetermined destination,
the coolant supply device being configured such that the coolant supplied to the predetermined destination by the supply pump is returned to the first coolant reservoir and coolant in the first coolant reservoir flows into the second coolant reservoir through the communicating part,
the coolant supply device including:
at least one agitation pump configured to pump coolant from the coolant tank;
a first agitating nozzle body connected to the at least one agitation pump, disposed at a position diagonal to a connecting portion between the communicating part and the first coolant reservoir in the first coolant reservoir, and configured to discharge the coolant pressurized by the at least one agitation pump in a direction toward the communication part to assist a flow of coolant flowing from the first coolant reservoir toward the communicating part; and
a second agitating nozzle body connected to the at least one agitation pump, disposed near a connecting portion between the communicating part and the second coolant reservoir in the second coolant reservoir, and configured to discharge the coolant pressurized by the at least one agitation pump in a direction of a flow of coolant flowing into the second coolant reservoir from the communicating part to assist the flow of coolant flowing into the second coolant reservoir from the communicating part.

2. The coolant supply device of claim 1, wherein:
at least one of the first and second agitating nozzle bodies has a plurality of discharge ports; and
a discharge direction of at least one of the plurality of discharge ports is directed more centrally of a corresponding coolant reservoir than a discharge direction of a remaining discharge port.

3. The coolant supply device of claim 1, wherein:
the second coolant reservoir has a baffle plate disposed therein at a position ahead in a coolant discharge direction of the second agitating nozzle body; and
the baffle plate extends inward from an inner wall of the second coolant reservoir to obstruct the flow of coolant, with a clearance between the baffle plate and a bottom of the second coolant reservoir such that the coolant can flow through the clearance.

4. The coolant supply device of claim 2, wherein:
the second coolant reservoir has a baffle plate disposed therein at a position ahead in a coolant discharge direction of the second agitating nozzle body; and
the baffle plate extends inward from an inner wall of the second coolant reservoir to obstruct the flow of coolant, with a clearance between the baffle plate and a bottom of the second coolant reservoir such that the coolant can flow through the clearance.

5. The coolant supply device of claim 1, wherein the second coolant reservoir has a flow adjusting plate disposed therein for adjusting the flow of coolant flowing into the second coolant reservoir from the communicating part, the flow adjusting plate extending from the communicating part along an inner wall surface of the second coolant reservoir and facing the inner wall surface.

6. The coolant supply device of claim 2, wherein the second coolant reservoir has a flow adjusting plate disposed therein for adjusting the flow of coolant flowing into the second coolant reservoir from the communicating part, the flow adjusting plate extending from the communicating part along an inner wall surface of the second coolant reservoir and facing the inner wall surface.

7. The coolant supply device of claim 3, wherein the second coolant reservoir has a flow adjusting plate disposed therein for adjusting the flow of coolant flowing into the second coolant reservoir from the communicating part, the flow adjusting plate extending from the communicating part along an inner wall surface of the second coolant reservoir and facing the inner wall surface.

8. The coolant supply device of claim 4, wherein the second coolant reservoir has a flow adjusting plate disposed therein for adjusting the flow of coolant flowing into the second coolant reservoir from the communicating part, the flow adjusting plate extending from the communicating part along an inner wall surface of the second coolant reservoir and facing the inner wall surface.

9. The coolant supply device of claim 1, comprising a third agitating nozzle body connected to the at least one agitation pump, disposed in the communicating part, and configured to discharge the coolant pressurized by the at least one agitation pump toward the second coolant reservoir to assist a flow of coolant flowing toward the second coolant reservoir from the first coolant reservoir.

* * * * *